(12) United States Patent
Nathan et al.

(10) Patent No.: US 8,543,975 B2
(45) Date of Patent: Sep. 24, 2013

(54) BEHAVIOR-FIRST EVENT PROGRAMMING MODEL

(75) Inventors: Adam D. Nathan, Redmond, WA (US); Chi Wai Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 12/338,306

(22) Filed: Dec. 18, 2008

(65) Prior Publication Data
US 2010/0162207 A1 Jun. 24, 2010

(51) Int. Cl.
*G06F 9/44* (2006.01)

(52) U.S. Cl.
USPC ............................. 717/107; 717/108; 717/114

(58) Field of Classification Search
None
See application file for complete search history.

(56) References Cited

U.S. PATENT DOCUMENTS

| | | | |
|---|---|---|---|
| 5,680,617 A | 10/1997 | Gough et al. | |
| 7,369,680 B2 | 5/2008 | Trajkovic et al. | |
| 7,565,640 B2* | 7/2009 | Shukla et al. ................. | 717/105 |
| 7,594,166 B1* | 9/2009 | Ramakrishna et al. ....... | 715/234 |
| 7,627,834 B2* | 12/2009 | Rimas-Ribikauskas et al. .............................. | 715/863 |
| 7,912,877 B2* | 3/2011 | Shankar et al. ............... | 707/813 |
| 8,185,867 B2* | 5/2012 | Robinson ...................... | 717/109 |
| 2003/0071850 A1* | 4/2003 | Geidl ............................ | 345/781 |
| 2003/0229471 A1 | 12/2003 | Guralnik et al. | |
| 2004/0111698 A1* | 6/2004 | Soong et al. .................. | 717/102 |
| 2004/0181780 A1* | 9/2004 | Shiu .............................. | 717/121 |
| 2006/0026536 A1* | 2/2006 | Hotelling et al. ............. | 715/863 |
| 2006/0074621 A1 | 4/2006 | Rachman | |
| 2006/0246973 A1 | 11/2006 | Thomas et al. | |
| 2006/0259289 A1* | 11/2006 | Shia .............................. | 703/12 |
| 2007/0027808 A1* | 2/2007 | Dooley et al. ................. | 705/51 |
| 2009/0125879 A1* | 5/2009 | Miloushev et al. ........... | 717/108 |
| 2009/0327996 A1* | 12/2009 | Siegemund et al. .......... | 717/107 |

OTHER PUBLICATIONS

Tuupola, Mika, Pacman-Style Games in Director, retrieved at << http://www.director-online.com/buildArticle.php?id=815 >>, Oct. 16, 2008, pp. 7.
Bock, Conrad, "Unified Behavior Models", retrieved at << http://www.conradbock.org/unifiedbehaviormodel.html >>, Journal of Object-Oriented Programming, vol. 12, No. 5, Sep. 1999, pp. 9.
Hosn, et al., "XML Events—Adding Behaviour to XML Content", retrieved at << http://www2002.org/CDROM/alternate/120/ >>, Oct. 16, 2008, pp. 8.
Ferguson, et al., "Behavior Modeling in Commercial Games", retrieved at << http://seriousgames.bbn.com/behaviorauthoring/Behavior_Authoring_Games_Final_Report.pdf >>, Apr. 19, 2006, pp. 90.
Eric White, Pro .Net 2.0 Graphics Programming, 2006, p. 395, 1 page.

* cited by examiner

*Primary Examiner* — Matt Kim
*Assistant Examiner* — Hua Lu

(57) ABSTRACT

Traditional programming environments that support event-driven programming typically expose a model where the developer chooses an event to handle on a given object, and then writes the code for that event handler. In contrast, as described herein, the traditional flow of program development is reversed. A (configurable) event-handler ("behavior") is selected. Upon selection of one of the behaviors, the event triggering the behavior is selected. This is a "what-then-when" approach rather than the traditional "when-then-what" approach for event-driven programming.

18 Claims, 5 Drawing Sheets

BEHAVIOR-FIRST EVENT PROGRAMMING MODEL

BACKGROUND

In computer programming, event-driven or event-based programming is a programming model in which program flow is determined by events. An event is an action initiated either by a user, a device such as a timer or keyboard, or by the operating system. When an event occurs (fires), data about the event is typically collected by a piece of hardware or software which typically dispatches the event to an event handler, an asynchronous callback subroutine, for further processing. The data associated with an event and sent to the event handler specifies what type of event has fired and may include information such as when the event occurred, who or what caused the event to occur, and how the event should be processed.

A program that changes its behavior in response to events is said to be event-driven. Many interactive programs are event-driven. Event-driven programs can be written in any language, although are easier to write in languages that provide high-level abstractions to support events and event handling. Some integrated development environments provide code generation assistants that automate the most repetitive tasks associated with event handling.

SUMMARY

In software development, behavior(s) (e.g., configurable event-handler implementations) is selected. Upon selection of one of the behaviors, the event triggering the behavior is selected. This is a "what-then-when" approach rather than the traditional "when-then-what" approach for event-driven programming.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
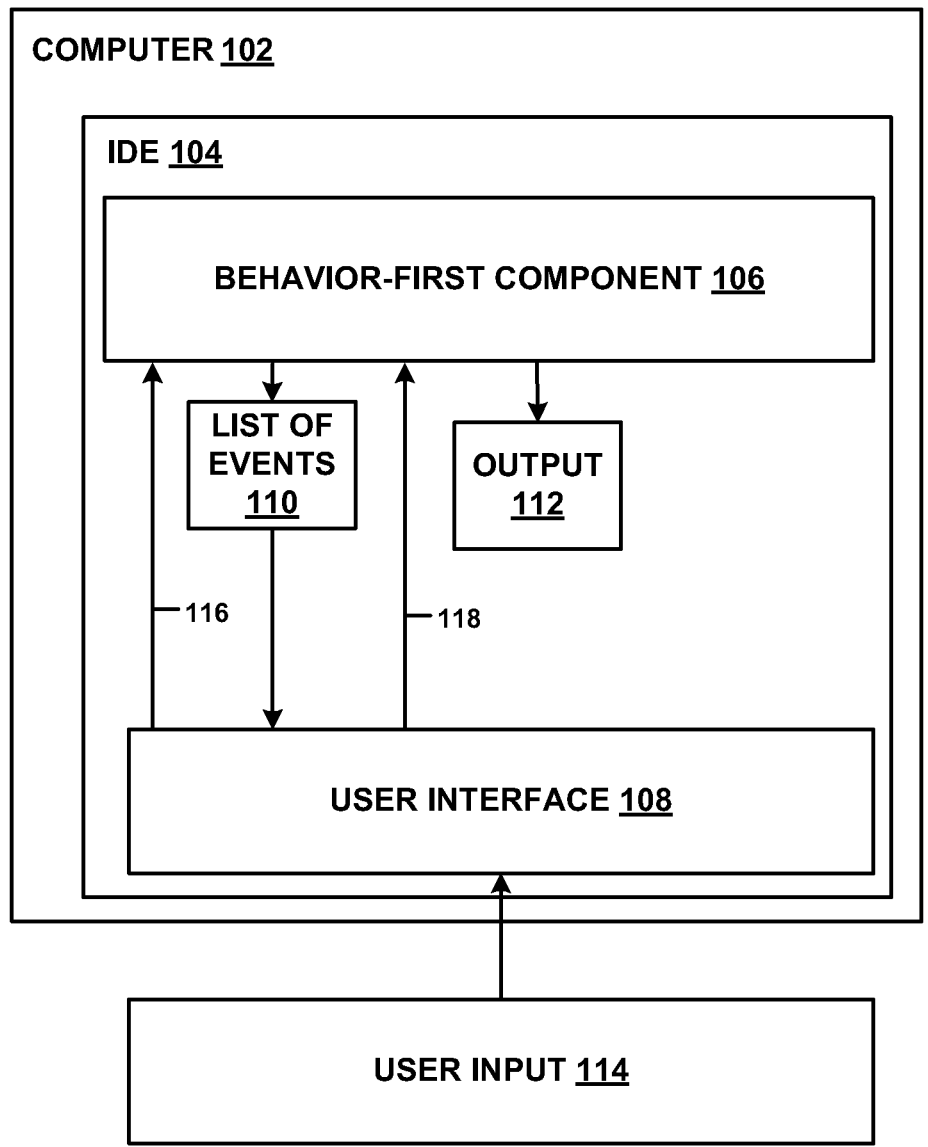
FIG. 1a is a block diagram of an example of system that provides a behavior-first event programming model in accordance with aspects of the subject matter disclosed herein.

Many traditional programming systems rely on event-driven programming where the flow of the program is determined by sensor outputs or user actions (e.g., mouse clicks or key presses) or messages from other programs or threads. Event-driven programming is a good model for many common situations in modern software development. For many domains including game development, real-time computing, web development, hardware peripheral handling and many others, the abstraction does not necessarily map well to how a developer may think of the problem. In such cases, reversing the "normal" event-driven flow to define behavior-driven actions may be more natural.

For example, in a video game development system that has abstractions for elements of the game that interact with each other and containers for the interacting elements, it is more natural for a developer to assign behaviors to the interacting elements in the game. For example, if one character is to move towards another character in the game, a game developer could define a behavior called "MoveTowardCharacter" and assign a motion activity to that Behavior. In the realm of peripheral handling, defining what a remote control does, and then defining which buttons map to which behavior may be more intuitive than designing the buttons of the remote control first.

Traditional programming environments that support event-driven programming typically expose a model where the developer chooses an event to handle on a given object, and then writes the code for that event handler. That is, in traditional event-driven programming, a developer chooses an event he wants to watch out for and then assigns actions to those events. For example, to use the video game example introduced above, in traditional programming environments, a game developer would first choose an event such as "receive left arrow key press" that would trigger a game state change, and then code in what happens when the event fires. In contrast, in accordance with aspects of the subject matter disclosed herein, the traditional flow of program development is reversed. First the developer or user is presented with a choice of possible (configurable) event-handler implementations or "behaviors" such as "increase game score" "change scene" or "create new game entity", etc. After selecting one, the user then specifies what event triggers the selected behavior. That is in behavior-driven programming, a user first chooses a class of behavior an object is to exhibit, and then configures the events, conditions and actions that apply. This is a "what-then-when" approach rather than a "when-then-what" approach.

For example, suppose a developer is programming in Visual Basic in an integrated development environment such as Visual Studio. Suppose the developer is creating an interactive form with a button on it. When the user clicks the button, the developer wants a new window to open. To create the interactive form in a traditional event-first programming model, the developer would first put the button on the form. Then he might be presented with a list of possible events for that button. Suppose the developer chooses a Click Event. Upon selection of the Click Event, the developer would be presented with a window and the shell of an empty function in which he could write the code to open the new window.

In contrast, in a behavior-first programming model, to perform the same programming task, first the developer would put the button on the form. Then he would specify what he wants to happen when the button is activated (he wants a new window to open). Then he would select the Click Event to be the trigger to open the new window.

Behavior-First Event Model

FIG. 1a illustrates an example of a system 100 that exposes a behavior-first event programming model. System 100 may include one or more of the following: a behavior-first component 106 executed by a processor of a computer 102 such as a computer described with respect to FIG. 3, and a user interface 108. The behavior-first component 106 may expose a behavior-first programming model for software development to a user or software developer via user interface 108. User interface 108 may receive user input 114 and provide the received user input to behavior-first component 106.

System 100 may be accessible from a client computer via a network such as the Internet or other network. A software developer or user may access the behavior-first component 106 from a client computer, for example, from a web browser. Alternatively, system 100 may be loaded onto a user's computer. System 100 may be a part of an integrated development environment 104 such as one described below with respect to FIG. 4. Input received by the behavior-first component 106 may be transformed by the behavior-first component 106 into a file such as a source code text file, a Script file or an XML file from which an event-driven program is generated or alternatively, the application may be generated directly by a compiler or by the behavior-first component 106. Input received by the behavior-first component 106 may be transformed by the behavior-first component 106 into an event-driven program.

The programming model exposed by behavior-first component 106 may include a set of abstractions for events and behaviors. These abstractions may make it easier for a user to develop software. In FIG. 1a, a user may provide input 114 to a user interface 108. For example, a user may provide input comprising a selected behavior (input 116). In response behavior-first component 106 may provide a list of events triggering the selected behavior, e.g., list of events, 110. The list of events 110 received from the behavior-first component 106 may be provided to the user via the user interface 108. In response to receiving user input selecting an event (input 118) to trigger the selected behavior, behavior-first component 106 may generate output 112. Output 112 may be executable program code, Script code suitable for input to a game engine or other Script consuming engine, XML code, text or any type of file.

Figure 1B:
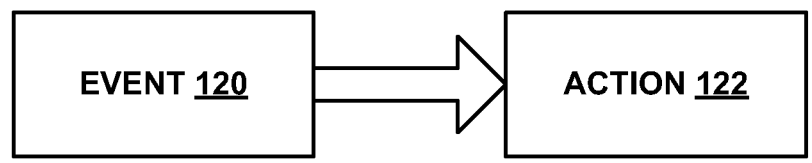
FIG. 1b is a block diagram showing the relationship between an event and an action as known in the prior art.
Figure 1C:
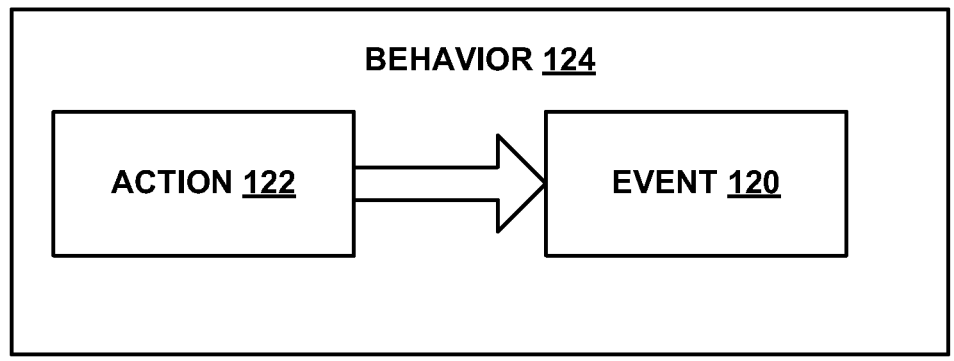
FIG. 1c is a block diagram showing the relationship between a behavior, an event and an action in accordance with aspects of the subject matter disclosed herein.

FIG. 1b illustrates the relationship between event 120 and action(s) 122 as known in the prior art. That is, first an event 120 is selected and then an action 122 is provided or selected that describes what will happen when the event 120 fires during program execution. FIG. 1c illustrates the relationship between behavior 124 and event(s) 120 and action(s) 122 in accordance with aspects of the subject matter disclosed herein. That is, the order may be reversed, so that during software development first an action 122 is selected or provided and then an event 120 triggering the action 122 is selected or provided during Moreover, a one-to-many or many-to-many relationship may be specified between actions and events. That is, an action 122 may be associated with one or more events 120 and an event 120 many be associated with one or more actions 122.

Figure 2:
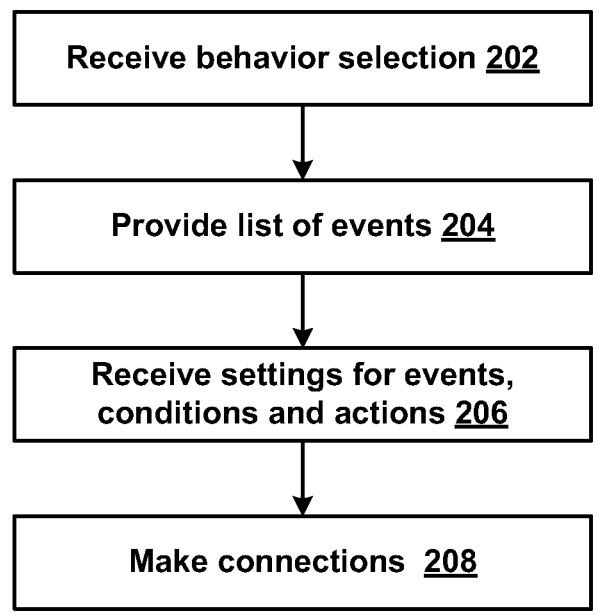
FIG. 2 is a flow diagram illustrating an example of a method for behavior-first event programming in accordance with aspects of the subject matter disclosed herein.

FIG. 2 illustrates a method 200 for creating software using a behavior-first programming model. At 202 a user may select or provide a behavior for an object on a user interface. The user interface may receive the selected or provided behavior and forward the selected behavior to a behavior-first component. At 204, in response to receiving the selected behavior, the behavior-first component may provide a list of events that can be associated with the selected behavior. The list may be provided to the user via a user interface. (It will be appreciated that one or more user interfaces may be involved in the dialog between user and behavior-first component.)

At 206, the user may configure events, conditions and actions associated with the selected behavior on the user interface(s). The settings may be sent to the behavior-first component. At 208, in response to receiving the settings and configurations, the behavior-first component may generate connections so that at runtime the desired actions are performed. For example, in the realm of game creation/development, one contemplated method of linking up behaviors, events and actions with characters involves generation of unique identifiers for referencing the characters in XML, parsing the XML into a JavaScript object during initialization and referencing the JavaScript object during each iteration of the game loop. Those skilled in the art will appreciate, however, that one of many different programming approaches may be employed for performing this task.

Example of a Suitable Computing Environment

Figure 3:
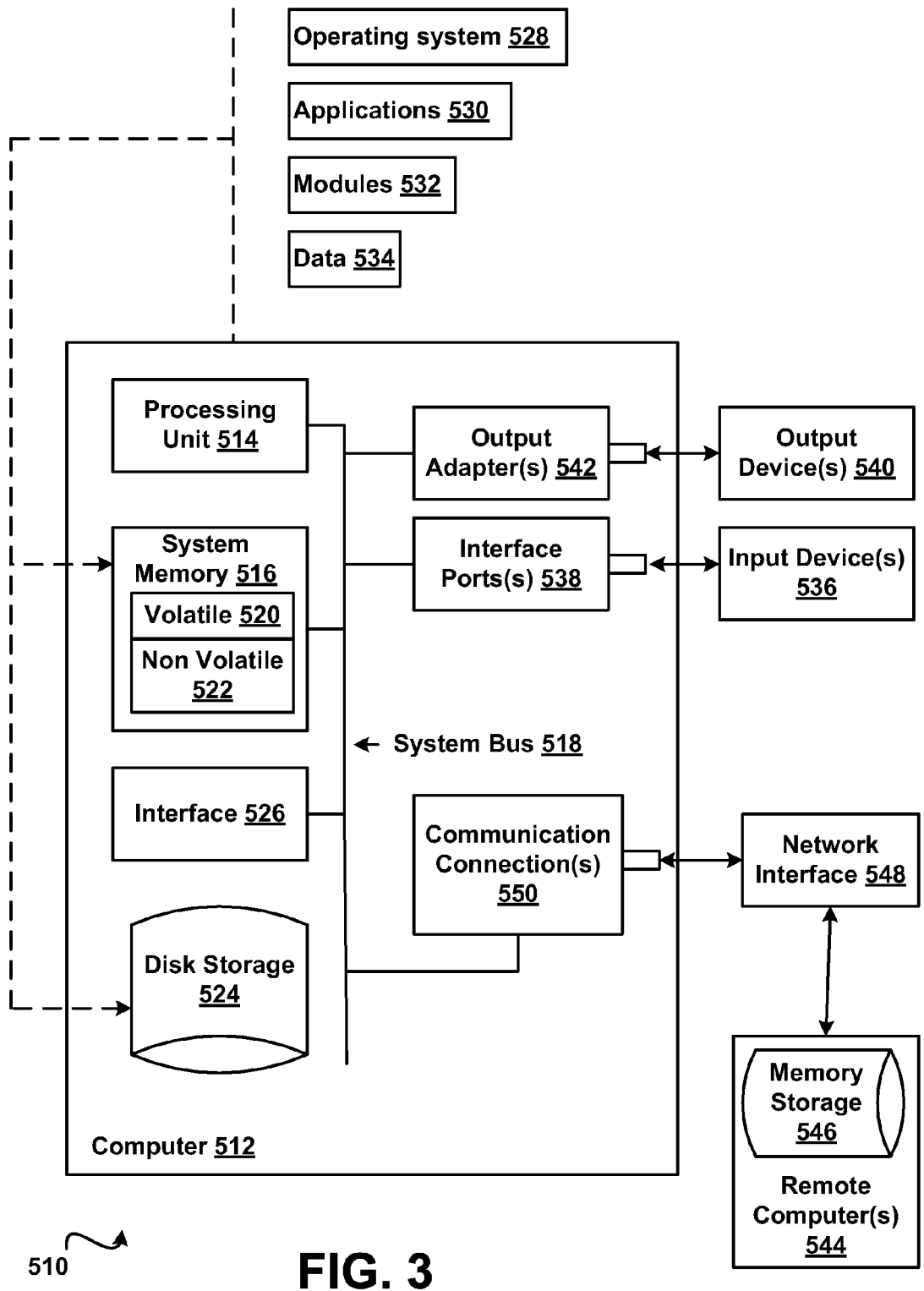
FIG. 3 is a block diagram of an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3 a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
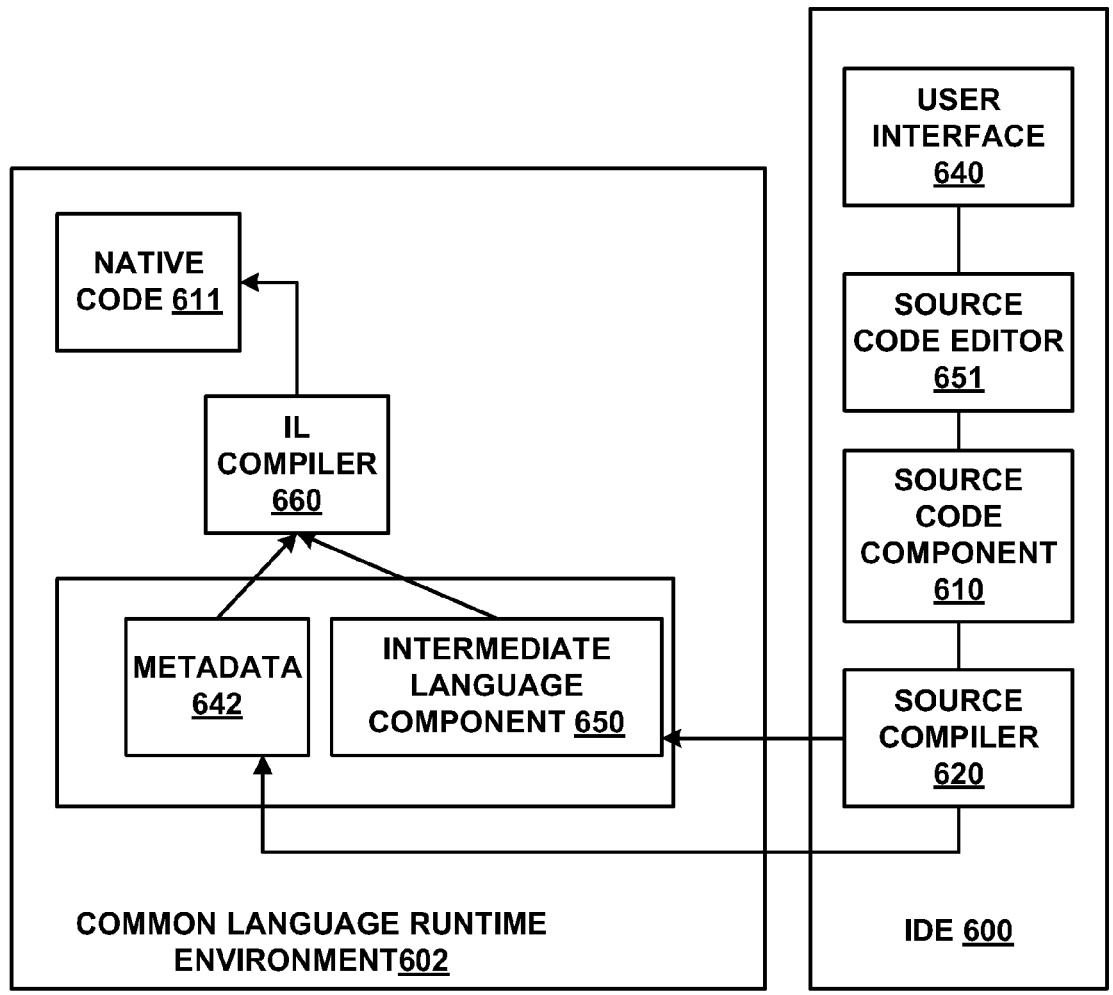
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system for exposing a behavior-first event programming model comprising:
a software development computer comprising a processing unit coupled to a memory, the memory comprising an integrated development environment employed during development of an executable program, the integrated development environment comprising a behavior-first component exposing a behavior-first programming model for software development via at least one user interface, wherein the behavior-first programming model includes a set of abstractions for events and behaviors for use in developing a software program, wherein the behavior-first component receives selection from a user of a behavior comprising a configurable event-handler, the behavior-first component, in response to the selection, provides a list of a plurality of events that can be associated with the behavior to the user via the at least one user interface, the behavior-first component then receiving from the user selection of an event of the plurality of events on the list to trigger the behavior via the at least one user interface, the behavior-first component then transforming the received behavior and event into the executable program.

2. The system of claim 1, further comprising:
the at least one user interface, wherein the at least one user interface receives input from the user and transfers the received input to the behavior-first component.

3. The system of claim 1, wherein the behavior-first component receives configuration settings for events, conditions and actions associated with the selected behavior.

4. The system of claim 1, wherein the behavior-first component generates an event-driven program from information received via the at least one user interface.

5. The system of claim 1, wherein the behavior-first component generates output from which an event-driven program is generated.

6. The system of claim 5, wherein the event-driven program is a video game.

7. The system of claim 1, wherein the event handler is user-defined.

8. A method for creating an event-driven program comprising:
using an integrated development environment, during development of an executable program:
receiving selection of a behavior comprising a configurable event-handler based on input received from a user of a behavior-first programming model executed by a processor via at least one user interface;
in response to receiving selection of the behavior, providing a list of a plurality of events that can be associated with the behavior via the at least user interface;
receiving from the user an event of the plurality of events on the list to trigger the behavior via the at least one user interface; and
transforming the received behavior and event into the executable program.

9. The method of claim 8, further comprising:
receiving configuration settings via the at least one user interface for events, conditions and actions associated with the received behavior.

10. The method of claim 9, further comprising:
in response to receiving the configuration settings, generating connections so that at runtime the actions associated with the received behavior are performed.

11. The method of claim 8, further comprising:
generating a file from which the executable program is generated.

12. The method of claim 11, wherein the file comprises an XML file, wherein the XML in input to a game engine and the executable program is a video game.

13. The method of claim 8, further comprising:
receiving input from a user via a user interface.

14. A computer-readable storage memory comprising computer-executable instructions which when executed cause a computing environment to:
during development of an executable program, using an integrated development environment to:
receive a behavior comprising a configurable event-handler based on input received from a user of a behavior-first programming model executed by a processor via at least one user interface;
in response to receiving the behavior, provide to the user a list of a plurality of events that can be associated with the behavior via the at least one user interface;
receive from the user selection of an event of the plurality of events on the list to trigger the behavior via the at least one user interface; and
transform the received behavior and event into the executable program.

15. The computer-readable storage memory of claim 14, comprising further computer-executable instructions, which when executed cause the computing environment to:
generate a file from which the executable program is generated.

16. The computer-readable storage memory of claim 15, comprising further computer-executable instructions, which when executed cause the computing environment to:
wherein the file comprises an XML file, wherein the XML in input to a game engine and the executable program is a video game.

17. The computer-readable storage memory of claim 14, comprising further computer-executable instructions, which when executed cause the computing environment to:
generate a file from which the executable program is generated, the file comprising a source code file, an XML file, a script file, or a text file.

18. The computer-readable storage memory of claim 14, comprising further computer-executable instructions, which when executed cause the computing environment to:
generate the executable program directly.

* * * * *